(12) United States Patent
Feser et al.

(10) Patent No.: US 9,187,051 B2
(45) Date of Patent: Nov. 17, 2015

(54) METHOD FOR DETECTING AN IMMINENT ROLLOVER OF A VEHICLE

(71) Applicants: Conti Temic Microelectronic GmbH, Nürnberg (DE); Continental Automotive GmbH, Hannover (DE)

(72) Inventors: Michael Feser, Barbing (DE); Jochen Schmidt, Langenargen (DE); Gregory Baratoff, Wangen (DE); Andreas Raith, Geisenfeld (DE); Rudolf Ertlmeier, Geisenfeld (DE); Thomas Brandmeier, Wenzenbach (DE)

(73) Assignees: Conti Temic Microelectronic GmbH (DE); Continentail Automotive GmbH (DE)

( * ) Notice: Subject to any disclaimer, the term of this patent is extended or adjusted under 35 U.S.C. 154(b) by 0 days.

(21) Appl. No.: 14/359,354

(22) PCT Filed: Sep. 20, 2012

(86) PCT No.: PCT/DE2012/100291
§ 371 (c)(1),
(2) Date: May 20, 2014

(87) PCT Pub. No.: WO2013/079057
PCT Pub. Date: Jun. 6, 2013

(65) Prior Publication Data
US 2014/0330485 A1    Nov. 6, 2014

(30) Foreign Application Priority Data

Nov. 29, 2011   (DE) .................. 10 2011 055 795

(51) Int. Cl.
*G01S 3/784*   (2006.01)
*G01S 5/16*    (2006.01)
*B60R 21/013*  (2006.01)
*B60R 16/023*  (2006.01)

(52) U.S. Cl.
CPC ........... *B60R 16/0233* (2013.01); *B60R 21/013* (2013.01); *G01S 3/784* (2013.01); *G01S 5/163* (2013.01)

(58) Field of Classification Search
CPC .............. B60R 21/013; B60R 21/0132; B60R 16/0233; B60R 2021/01322; G01S 3/784; G01S 5/163
See application file for complete search history.

(56) References Cited

U.S. PATENT DOCUMENTS 7,260,460 B2 *  8/2007  Mattes et al. ............... 701/45
2003/0021445 A1  1/2003  Larice et al.

(Continued)

FOREIGN PATENT DOCUMENTS

DE    198 22 184    11/1999
DE    199 62 491    7/2001

(Continued)

OTHER PUBLICATIONS

International Search Report corresponding to application No. PCT/DE2012/100291, dated Nov. 30, 2012.

(Continued)

*Primary Examiner* — Michael J Zanelli
(74) *Attorney, Agent, or Firm* — RatnerPrestia

(57) ABSTRACT

A method and a device for detecting an imminent rollover of a vehicle. The method comprises taking a series of images of the surroundings of the vehicle, in particular of the road ahead, with a camera; determining and tracking point features in the series of images; eliminating point features which are located on objects that move relative to the stationary surroundings of the vehicle; and computing at least one parameter of the rotational movement of the camera (roll, pitch and/or yaw rate) taking into account the remaining point features.

15 Claims, 2 Drawing Sheets

(56) References Cited

U.S. PATENT DOCUMENTS

| | | | |
|---|---|---|---|
| 2003/0210807 A1* | 11/2003 | Sato et al. | 382/104 |
| 2005/0102083 A1 | 5/2005 | Xu et al. | |
| 2005/0168575 A1 | 8/2005 | Mattes et al. | |
| 2007/0095588 A1 | 5/2007 | Mattes et al. | |
| 2008/0262680 A1 | 10/2008 | Yeh et al. | |
| 2012/0173083 A1* | 7/2012 | Hsu et al. | 701/45 |
| 2012/0281881 A1 | 11/2012 | Walter | |

FOREIGN PATENT DOCUMENTS

| | | |
|---|---|---|
| DE | 102 04 128 | 8/2003 |
| DE | 10 2004 026 638 | 10/2005 |
| DE | 10 2004 046 101 | 9/2006 |
| DE | 10 2009 055 776 | 5/2011 |
| EP | 1 240 533 | 6/2005 |
| EP | 1 474 315 | 3/2006 |
| WO | WO 2004/041611 | 5/2004 |
| WO | WO 2008/104263 | 9/2008 |

OTHER PUBLICATIONS

German Search Report corresponding to application No. DE 10 2011 055 795.4, dated Feb. 7, 2012.

International Preliminary Report on Patentability for PCT/DE2012/100291 dated Jun. 3, 2014.

* cited by examiner

METHOD FOR DETECTING AN IMMINENT ROLLOVER OF A VEHICLE

CROSS REFERENCE TO RELATED APPLICATION

This application is the U.S. National Phase Application of PCT International Application No. PCT/DE2012/100291, filed Sep. 20, 2012, which claims priority to German Patent Application No. 10 2011 055 795.4, filed Nov. 29, 2011, the contents of such applications being incorporated by reference herein.

FIELD OF THE INVENTION

The invention relates to a method for detecting an imminent rollover of a vehicle as part of a rollover detection function.

BACKGROUND OF THE INVENTION

EP 1240533 B1, which is incorporated by reference, shows a method for detecting a rollover and for activating occupant protection means in vehicles. An angle of inclination of the vehicle relative to a flat road surface, which angle is derived from visual surveillance of the surroundings, is linked to the angle of inclination determined by an angular rate sensor. The occupant protection means are only activated if the two angles of inclination that have been determined are the same.

EP 1474315 B1, which is incorporated by reference, shows a device for detecting a rollover, which device is based on a stereo camera measuring distances to objects and generating image vectors for each image sensor. A rollover is detected based on the change of vertical components of these image vectors over time.

SUMMARY OF THE INVENTION

An aspect of the present invention provides a method for the early, cost-efficient and reliable detection of an impending rollover of a vehicle.

A method for detecting an imminent rollover is provided, which method comprises the steps listed below:

Step a) Taking a series of images of the surroundings of the vehicle, in particular of the road ahead, with a camera. Said camera may preferably be a mono or stereo camera which, for example, is arranged inside the vehicle, behind the windscreen, and looks through the windscreen.

Step b) Determining and tracking point features in the series of images (point feature tracking). Suitable point features are, in particular, obtained by a first image analysis as prominent point features that lend themselves to tracking in the series of images, e.g. due to high contrast, a special color and/or shape.

Step c) Eliminating point features which are located on objects that move relative to the stationary surroundings of the vehicle. Said stationary surroundings of the vehicle include, in particular, the road, roadside markings and barriers, traffic signs, bridges, etc. Moving objects are, for example, vehicles traveling ahead or in the opposite direction or pedestrians walking along the road. The distinction between "stationary" and "moving" can, for example, be made by analyzing the series of images, taking into account additional assumptions or taking into account data from other sensors (e.g. radar or lidar) that are capable of determining relative speeds to other objects, if appropriate. Step d) Computing at least one parameter of the rotational movement of the camera (roll, pitch and/or yaw rate) taking into account the remaining point features. It is assumed that the camera movement is the same as the movement of the vehicle as the camera is connected to the vehicle. The motion parameter(s) is/are at least approximated, i.e. estimated. For this purpose, a so called Structure from Motion method may be used, which reconstructs three-dimensional (3D) structures from objects moved over time on two-dimensional images.

An advantage of the invention is that the motion parameters which are relevant for detecting a rollover are determined in a reliable and cost-efficient way.

An advantageous configuration of the invention includes a further step e) in which a protective function for the occupants of the vehicle is activated if a characteristic roll parameter, which depends at least on the computed roll rate (speed of rotation about the vehicle's longitudinal axis), exceeds a threshold depending on the computed roll angle. A protective function is, for example, the activation of seat belt pre-tensioners, airbags or roll bars. The characteristic roll parameter may also take into account the computed pitch or yaw rate in addition to the roll rate.

In an advantageous embodiment, all or selected translational motion parameters, i.e. speeds and/or accelerations in the three spatial directions, may be included in the characteristic roll parameter. Said motion parameters can also be derived from the approximation of the camera movement in step d), or they may be derived from data of an inertial sensing system comprising at least one inertial sensor. Said at least one inertial sensor may, in particular, be an angular rate sensor or an acceleration sensor of a sensor cluster of a vehicle (hereinafter vehicle dynamics sensor). Electronic stability programs such as ESC, longitudinal dynamics control functions such as ACC or adaptive forward lighting also use data from the sensor cluster. As an alternative or additionally, an acceleration sensor or crash sensor, which serves to activate an airbag or other protection devices, may be used. Compared to a vehicle dynamics sensor, said crash sensor is characterized by a larger measuring range, a lower resolution and a higher measuring frequency.

Preferably, at least 100 points are determined and tracked as point features in step b).

In a preferred embodiment of the invention, the position of the point features or points in the image is determined and tracked with sub-pixel precision in step b).

According to an advantageous configuration of the invention, a direct analysis of the image data is taken into account to determine the moving point features in step c).

Optionally, the moving point features are determined in step c) taking into account an analysis of the image data done by at least one second driver assistance functionality, for example a traffic sign detection or a lane detection function.

In an advantageous embodiment, the moving point features are determined in step c) taking into account data from at least one further sensor located in the vehicle (e.g. radar or lidar).

According to a preferred embodiment, it is assumed in step d) that the camera is calibrated, i.e. intrinsic parameters of the camera (focal length, horizontal and vertical pixel spacing, displacement of the image focal point) are known.

Preferably, the roll angle will be estimated in step d) based on the sum of the roll angle changes between directly successive image pairs of a series of images. In this case, the errors of the individual roll angle change estimates sum up. To correct this, the roll angle can be estimated based on the change of the roll angle between the first and the last image of a defined number n of successive images of a series of images (sub-series comprising n images), either alternatively or cumulatively.

In an advantageous configuration of the invention, the series of images is taken with a stereo camera in step a), i.e. the camera is a stereo camera.

In this case, the road surface may advantageously be estimated based on disparities of a stereo image, and the result can then be used to estimate the absolute roll angle to the road surface in step d).

As an alternative, the roll angle may be estimated separately for each of the two image recording units of the stereo camera, i.e. as in case of a mono camera.

Advantageously, point features or points from the series of stereo images can be tracked in three dimensions by means of optical flow, and the rotational movement of the camera and hence the roll angle can be directly estimated based on 3D point correspondences.

The method according to the invention can advantageously be used to verify the plausibility of an imminent rollover of the vehicle which has been detected by means of an inertial sensing system.

As an alternative, the motion parameters computed in step d) may be fused with data from an inertial sensing system, and the fused data may be considered for the roll rate and the roll angle in step e).

According to another advantageous embodiment, activation may not take place in step e) until plausibility has been verified by means of data from another and/or the aforesaid inertial sensing system.

The invention also relates to a device for detecting an imminent rollover of a vehicle, comprising a camera, evaluation means and a rollover detection unit.

The camera serves to take a series of images of the surroundings of the vehicle.

The evaluation means serve to determine and track point features in the series of images, wherein the evaluation means eliminate point features which are located on objects that move relative to the stationary surroundings of the vehicle and compute at least one rotational parameter of the camera movement (roll, pitch and/or yaw rate ($\psi'$)) taking into account the remaining point features. The rollover detection unit uses the motion parameters computed by the evaluation means to generate a signal for activating a protection device in case a rollover is detected.

BRIEF DESCRIPTION OF THE DRAWINGS

Hereinafter, the invention will be explained with reference to exemplary embodiments and figures.

In the figures.

DETAILED DESCRIPTION OF THE PREFERRED EMBODIMENT

Figure 1:
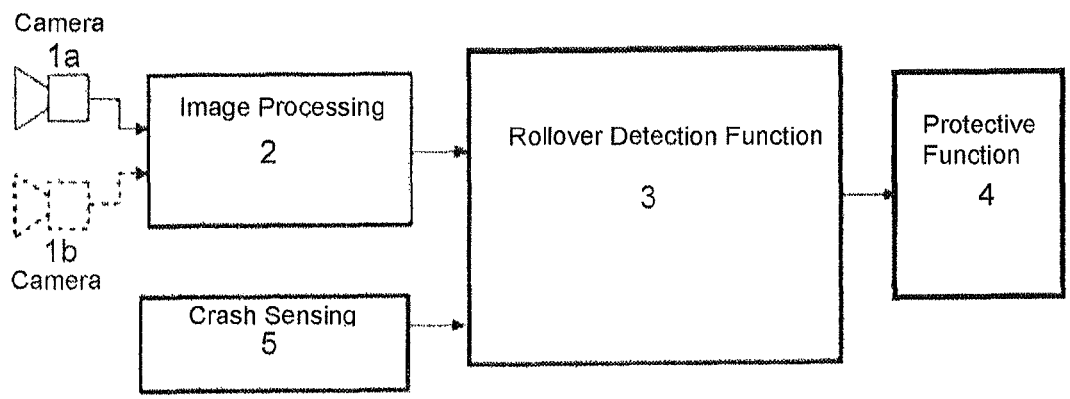
FIG. 1 shows a diagram of a method for detecting an imminent rollover of a vehicle

The illustration in FIG. 1 provides an overview of the process of a method for detecting an imminent rollover of a vehicle. A mono camera (1*a*) or a stereo camera (1*a* and 1*b*) takes a series of images. Image processing (2) is used to evaluate and analyze the image data. The resulting motion data ($\phi'$, $\theta'$, $\psi'$, vx, vy, vz, ax, ay, az) (of the camera and hence of the vehicle) is transferred to a rollover detection function (3). In addition, said rollover detection function (3) receives motion data ($\phi'$, $\theta'$, $\psi'$, vx, vy, vz, ax, ay, az) determined by an inertial or crash sensing system (5). The rollover detection function (3) provides a signal (TS) for activating a protective function (4) if an imminent rollover has been detected.

This means, motion parameters of the vehicle are computed based on a camera system. In the simplest case, the roll rate ($\phi'$) is computed and provided to a rollover algorithm (i.e. a rollover detection function (3)). The rollover algorithm uses motion parameters (e.g. the roll rate ($\phi'$)) computed based on the camera data to decide whether the vehicle will overturn or not. If an impending rollover has been detected—and plausibility has been verified, if appropriate—a protective function (4) is activated.

Figure 2A:
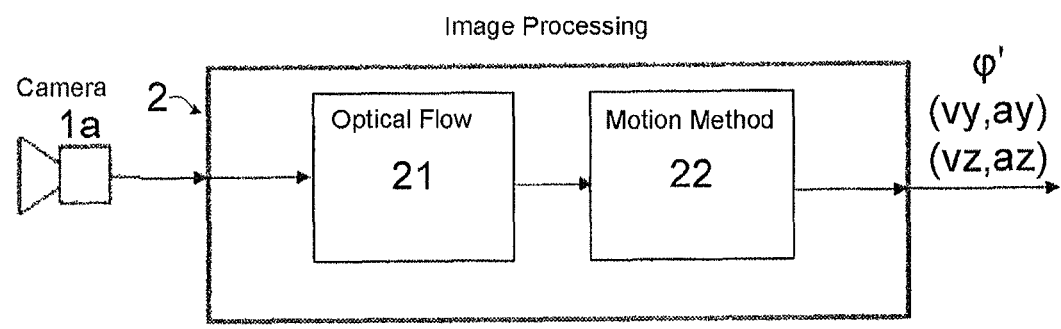
FIG. 2*a* shows the evaluation of image data from a mono camera

FIG. 2*a* shows a first variant of image processing (2), which receives data from a mono camera (1*a*). The image processing function (2) uses the series of images to determine optical flow (21). Subsequently, the camera movement is at least approximated by means of a Structure from Motion method (22).

The computed rotational motion parameters—and translational motion parameters, if appropriate—are transmitted to the rollover detection function (3). Typically, the roll rate WO is transmitted, but the pitch ($\theta'$) and/or yaw rate ($\psi'$), i.e. further rotational motion parameters, space velocities (vx, vy, vz) and/or space accelerations (ax, ay, az), i.e. translational motion parameters, may also be transmitted.

This means, the parameter of rotational movement ($\phi'$, $\theta'$, $\psi'$) of a vehicle, which is important for a rollover sensor (rollover detection device), can be computed exclusively from image data provided by a camera (1*a*). The following algorithmic components are required:

Point feature tracking over time

Elimination of features which are located on moving objects

Computation of the camera movement

Point Feature Tracking

Requires an algorithm for detecting and tracking interesting points (i.e. points that lend themselves to tracking) over time, i.e. from one image to the next. Suitable approaches include e.g. optical flow (21) or a Tomasi Kanade tracker. It is important that the points be detected with sub-pixel precision as this is crucial for the precision of the subsequent reconstruction of the movement. A few hundred points should be tracked to obtain stable results.

Elimination of Outliers

The detection and elimination of outliers in the tracked point features is an important part of the method. Common algorithms for computing the camera movement require static scenes, i.e. movement in the image is only caused by movement of the camera, all other objects do not move relative to each other. As this is not the case in a typical street or road scene, features which are not located on the non-moving background must be removed. Such features are referred to as outliers in this context.

The following options are available:

Use of tried-and-tested methods for eliminating outliers (based on RANSAC (RANdom Sample Consensus) or LMedS (Least Median of Squares) with the aid of the fundamental matrix)

Detection of objects with the aid of other algorithms which are possibly used by the control unit of the camera (1*a*) or by the image data evaluation function in any case (in particular camera-based identification/classification of objects or estimation of the road surface by the lane detection function or the traffic sign detection function (which would then provide non-outliers))

Detection of objects with the aid of other sensors available in the vehicle (in particular radar)

or combinations of the aforesaid methods.

Computation of the Camera Movement

The camera movement can be computed based on the point features tracked over time. In principle, all Structure from Motion methods are suitable for doing this. With regard to the rollover sensing system, however, there are a few additional conditions which make computation easier. Only the rotational component of the movement ($\phi'$, $\theta'$, $\psi'$) is required, and the camera (1a) is calibrated, i.e. the intrinsic camera parameters are known.

It is suggested that the 5 point algorithm according to Nister be used for computation, which computes the essential matrix E with no need to compute the fundamental matrix first and is therefore more robust. The essential matrix E contains the 3×3 rotation matrix R and the 3D translation vector t; both components can be extracted from the matrix except for an unknown scaling factor in case of the translation (not important for the rollover sensing system). The rotation matrix can be divided into three components (roll, pitch, yaw), thus directly providing a relative roll angle (typically relative to the previous image). If only directly successive images are always used for computation, an addition of the relative roll angles will result in an accumulation of errors, which means that the roll angle ($\phi$) associated with an earlier reference image is not available with the required precision. As typically enough points can be tracked over several images, these should be used for another, additional determination of the roll angle ($\phi$) to obtain a more stable estimate, although with a lower update rate.

Figure 2B:
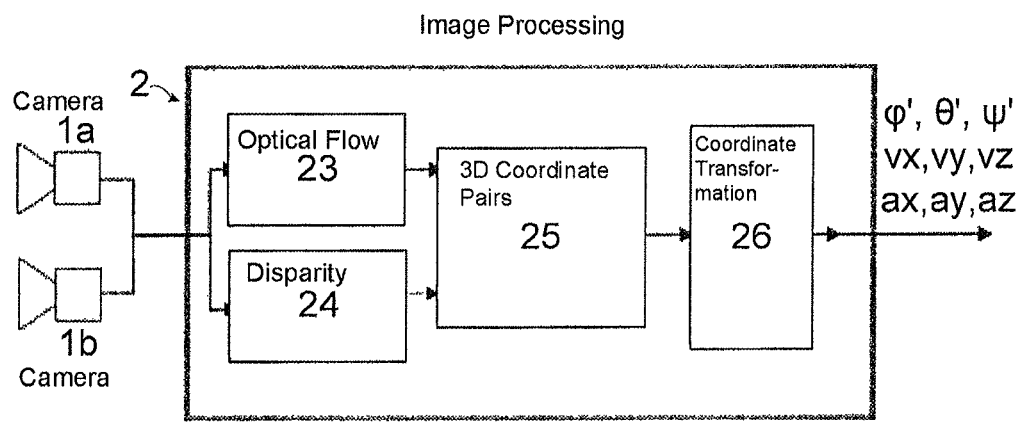
FIG. 2*b* shows the evaluation of image data from a stereo camera

FIG. 2b shows a second variant of image processing (2), which receives data from a stereo camera, i.e. two camera units (1a and 1b). The image processing function (2) uses the series of images to determine optical flow (23) and disparity (24). As a result, 3D coordinate pairs (25) are obtained, which are used to at least approximate the camera movement by means of coordinate transformation (26).

Motion parameters which may be transferred to the rollover detection function (3) include all rotational angular velocities ($\phi'$, $\theta'$, $\psi'$) but also translational speeds (vx, vy, vz) and/or accelerations (ax, ay, az) in the longitudinal, lateral and vertical direction.

If a stereo camera (1a and 1b) is used, there are further options to estimate the roll angle, e.g.:

Estimation of the road surface based on the disparities (24); the result can be used to compute the absolute roll angle ($\phi$) to the road by means of simple trigonometric functions.

Same process of computation as in case of the mono camera (1a) but separately for the left (1a) and right (1b) camera. In this way, the plausibility of the individual roll angles ($\phi$) can be verified.

Computation of the camera movement based on 3D points (present due to disparity (24)). With the aid of optical flow (23), 3D points can be tracked over time. In contrast to the mono camera (1a), 3D point correspondences are available, which can be used to directly estimate the rotation matrix R with no need to know or estimate translation.

If no optical flow (23) but only disparities (24) is/are available, computation can also be done using an ICP algorithm (Iterative Closest Point).

Figure 3:
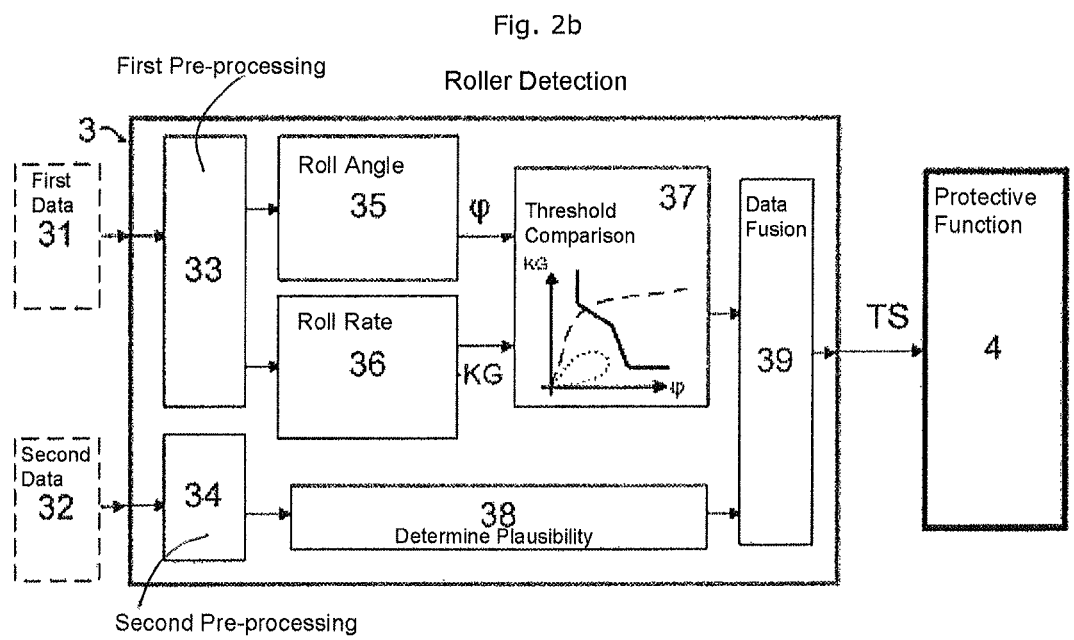
FIG. 3 shows a diagram of rollover detection based on data from at least two sources and output of a trigger signal to a protection device.

One example of how the rollover detection function (3) works is shown in FIG. 3. First data (31) (shown by dashed lines) serves to compute the roll angle ($\phi$) and the characteristic roll parameter (KG). The first data (31) is supplied to a first pre-processing function (33). Subsequently, the roll angle (35) is at least approximated, and the characteristic roll parameter KG (36) is computed. Both computed values ($\phi$, KG) are compared to a threshold (37). This can be done, for example, by including them in a rollover map, as outlined in FIG. 3. Here, the roll angle ($\phi$) is shown on the abscissa, and the characteristic parameter (KG) is shown on the ordinate. The continuous line shows the threshold. The dotted line schematically shows a swaying motion of the vehicle without a rollover and the dashed line shows a rolling motion with the vehicle overturning in the end. An imminent rollover is detected by comparing the roll angle ($\phi$) and the characteristic roll parameter (KG) with the threshold.

In addition to the first data (31), second data (32) is available to the rollover detection function (3), which is intended to verify the plausibility of an imminent rollover. The second data is supplied to a second pre-processing function (34). Subsequently, the data is used to determine plausibility (38).

Finally, the values (39) obtained from the first and second data (31, 32) are fused. This may, for example, correspond to a logic AND operation. A trigger signal (TS) is output to the protection device (4) if the first data (31) indicates a rollover and the second data (32) used for verifying plausibility (38) confirms this. Transmission of a signal (TS) activates the protective function (4).

This means, the roll angle ($\phi$) is computed based on the motion parameters ($\phi'$, $\theta'$, $\psi'$, vx, vy, vz, ax, ay, az). The roll rate ($\phi'$) (and possibly further parameters or data) is also used to determine a characteristic parameter (KG) which can be compared with a variable threshold (depending, among other things, on the current roll angle ($\phi$)). If the characteristic parameter (KG) exceeds the threshold and at the same time plausibility is verified independently (e.g. by means of the crash sensing system), a protective function (4) will be activated.

For a first functional variant of the rollover detection function (3), an image processing function (2) according to the invention supplies the roll rate and optionally the acceleration in the y and z direction as first data (31) for detecting the rollover.

A crash sensing system supplies the lateral acceleration ay as second data (32) used for an independent verification of plausibility.

This may be regarded as a sensor reduction as no inertial sensors are required for stability control.

For a second functional variant of the rollover detection function (3), a first inertial sensing system (vehicle dynamics sensing system) supplies the roll rate and optionally the lateral and/or vertical acceleration (ay; az) as first data (31) for detecting whether the vehicle will overturn or not.

The motion parameters determined based on the camera movement, at least the roll rate and, in addition, the lateral and/or vertical acceleration (ay; az) from the first inertial sensing system (vehicle dynamics sensing system) and/or the lateral acceleration (az) from a second inertial sensing system (crash sensing system), are provided as second data (32) for verifying plausibility. In this way, an optimized plausibility path is obtained, so that plausibility can also be determined e.g. in phases of free flight.

In a third functional variant, the algorithm decides whether the vehicle will overturn or not, based on the first inertial sensing system (vehicle dynamics sensing system) and on the motion parameters (e.g. the roll rate) computed from the camera data as first data (31). For this purpose, the first data (31) is used to compute the roll angle and the characteristic roll parameter (KG) depending on the roll rate. If the characteristic parameter (KG) exceeds the threshold and at the same time plausibility is verified independently, a protective function will be activated. Plausibility is verified based on two data, in particular the lateral and vertical acceleration, and an inertial sensing system (accelerations), e.g. the vehicle dynamics sensor (ay, az), in combination with the crash sensor (ay).

The advantage of the third variant is improved response times, i.e. an improved performance of the method.

The second and third functional variant may be regarded as sensor fusion as the motion parameters obtained based on the camera along with data from an inertial sensing system are used as input data (either first (31) or second (32) data for rollover detection (3) (comparison with threshold (37) or verification of plausibility (38)).

REFERENCE NUMERALS 1a (+1b) Mono camera (stereo camera)
2 Image processing
3 Rollover detection
4 Protective function
5 Inertial sensing system
21 Optical flow
22 Structure from Motion method
23 Optical flow
24 Disparity
25 3D coordinate pairs
26 Coordinate transformation
31 First data
32 Second data
33 First pre-processing
34 Second pre-processing
35 Computation of roll angle
36 Computation of roll rate
37 Comparison with threshold
38 Determination of plausibility
39 Data fusion
$\phi$ Roll angle
$\phi'$ Roll rate
$\theta'$ Pitch rate
$\psi'$ Yaw rate
vx, vy, vz Speed in x, y and z direction
ax, ay, az Acceleration in x, y and z direction
KG Characteristic roll parameter
TS (Trigger) signal

The invention claimed is:
1. A method for detecting an imminent rollover of a vehicle, comprising:
   a) taking a series of stereo images of the surroundings of the vehicle with a stereo camera that includes two cameras,
   b) determining and tracking, by an image processor, point features in the series of stereo images,
   c) eliminating, by the image processor, point features which are located on objects that move relative to the stationary surroundings of the vehicle,
   d) computing, by the image processor, rotational parameters of the stereo camera movement (roll rate ($\phi'$), pitch rate ($\theta'$) and yaw rate ($\psi'$)) taking into account the remaining point features,
   e) estimating, by the image processor, a roll angle ($\phi$) separately for each of the two cameras based on the roll rate ($\phi'$) of the stereo camera, and
   f) comparing, by the image processor, the roll angle ($\phi$) for each of the two cameras to a threshold to detect the imminent rollover.

2. The method according to claim 1, further comprising g) activating a protective function if a characteristic roll parameter, which depends at least on the computed roll rate ($\phi'$), exceeds a threshold depending on a roll angle ($\phi$) which is computed based on the roll rate ($\phi'$).

3. The method according to claim 2, wherein in step g), the characteristic roll parameter additionally depends on at least one translational parameter of vehicle movement (vx, vy, vz, ax, ay, az), wherein the at least one translational parameter (vx, vy, vz, ax, ay, az) is at least one of computed based on the camera movement and determined by an inertial sensing system in step d).

4. The method according to claim 2, wherein the roll angle ($\phi$) is estimated in step d) based on the sum of the roll angle changes between successive image pairs of a series of images and/or based on the change of the roll angle between the first and the last image of a defined number of successive images of a series of images.

5. The method according to claim 2, wherein the motion parameters ($\phi'$, $\theta'$, $\psi'$) computed in step d) are fused with data from an inertial sensing system, and the fused data is considered for the roll rate ($\phi'$) and the roll angle ($\phi$) in step g).

6. The method according to claim 5, wherein activation does not take place in step g) until plausibility has been verified by means of data from another and/or the aforesaid inertial sensing system.

7. The method according to claim 1, wherein the point features in step b) comprise at least 100 points.

8. The method according to claim 1, wherein the position of the point features or points in the image is determined and tracked with sub-pixel precision in step b).

9. The method according to claim 1, wherein a direct analysis of the image data is taken into account to determine the moving point features in step c).

10. The method according to claim 1, wherein an analysis of the image data by at least one second driver assistance functionality is taken into account to determine the moving point features in step c).

11. The method according to claim 1, wherein data from at least one further sensor located in the vehicle is taken into account to determine the moving point features in step c).

12. The method according to claim 1, wherein point features from the series of stereo images are tracked in three dimensions by means of optical flow, and the rotational camera movement ($\phi'$, $\theta'$, $\psi'$) can be directly estimated based on 3D point correspondences.

13. The method according to claim 1, which is used to verify the plausibility of an imminent rollover of the vehicle which has been detected by means of an inertial sensing system.

14. The method according to claim 1, wherein the series of images of the surroundings of the vehicle are of the road ahead.

15. A device for detecting an imminent rollover of a vehicle, comprising:
   a) a stereo camera that includes two cameras for taking a series of images of the surroundings of the vehicle,
   b) an image processor for:
      determining and tracking point features in the series of images,
      eliminating point features which are located on objects that move relative to the stationary surroundings of the vehicle, computing rotational parameters of the stereo camera movement (roll rate ($\phi'$), pitch rate ($\theta'$) and yaw rate ($\psi'$) taking into account the remaining point features, estimating a roll angle ($\phi$) separately for each of the two cameras based on the roll rate ($\phi'$) of the stereo camera, and comparing the roll angle ($\phi$) for each of the two cameras to a threshold to detect the imminent rollover, c) a rollover detection unit which uses the motion parameters transferred from the image processor to generate a signal for activating a protection device in case a rollover is detected.

* * * * *